Feb. 14, 1961  J. F. MORSE  2,971,618
THROTTLE CONTROL MECHANISM FOR SINGLE LEVER CONTROL
Filed Sept. 26, 1958  3 Sheets-Sheet 2
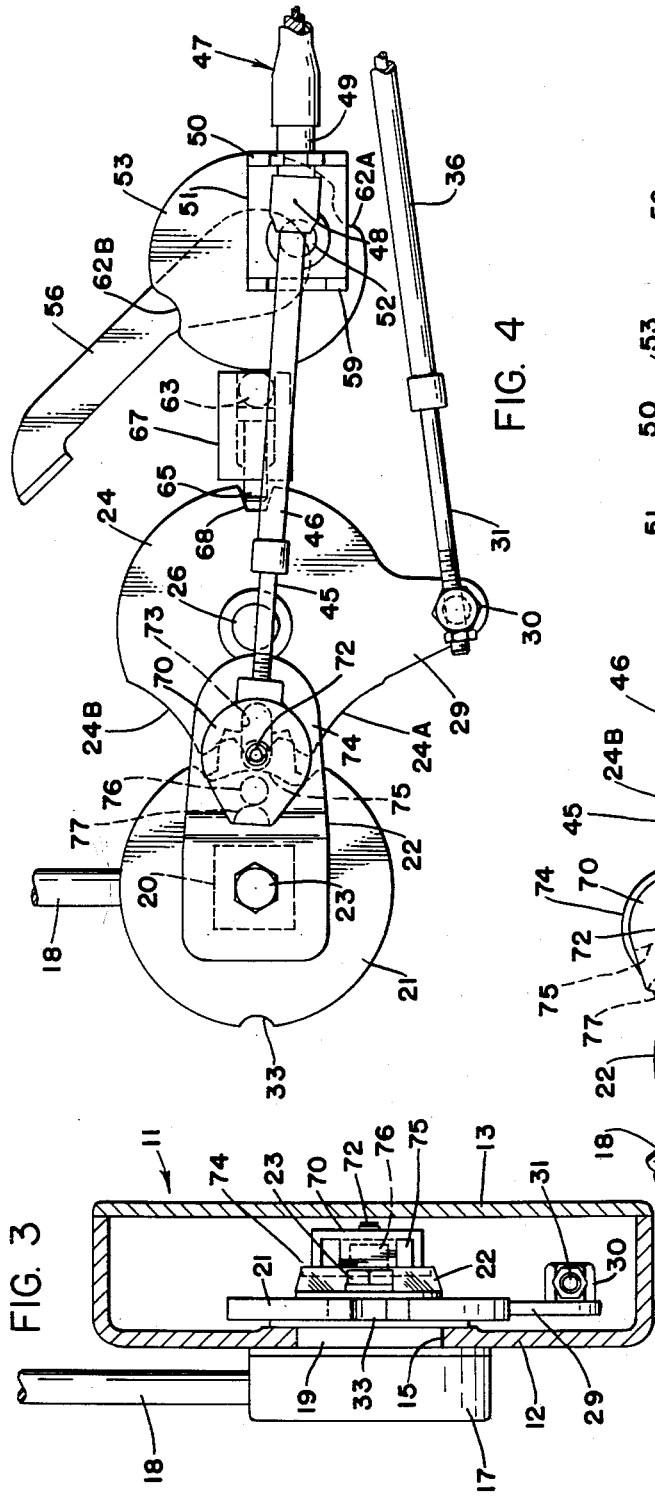
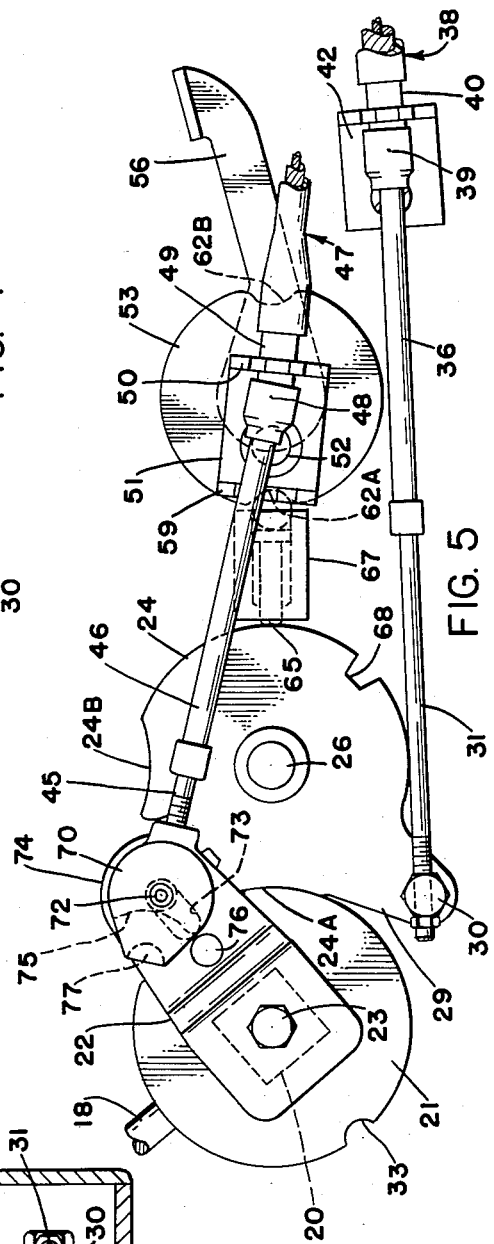
*INVENTOR.*
JOHN F. MORSE
BY *Ely, Frye & Hamilton*
ATTORNEYS Feb. 14, 1961  J. F. MORSE  2,971,618
THROTTLE CONTROL MECHANISM FOR SINGLE LEVER CONTROL
Filed Sept. 26, 1958  3 Sheets-Sheet 3

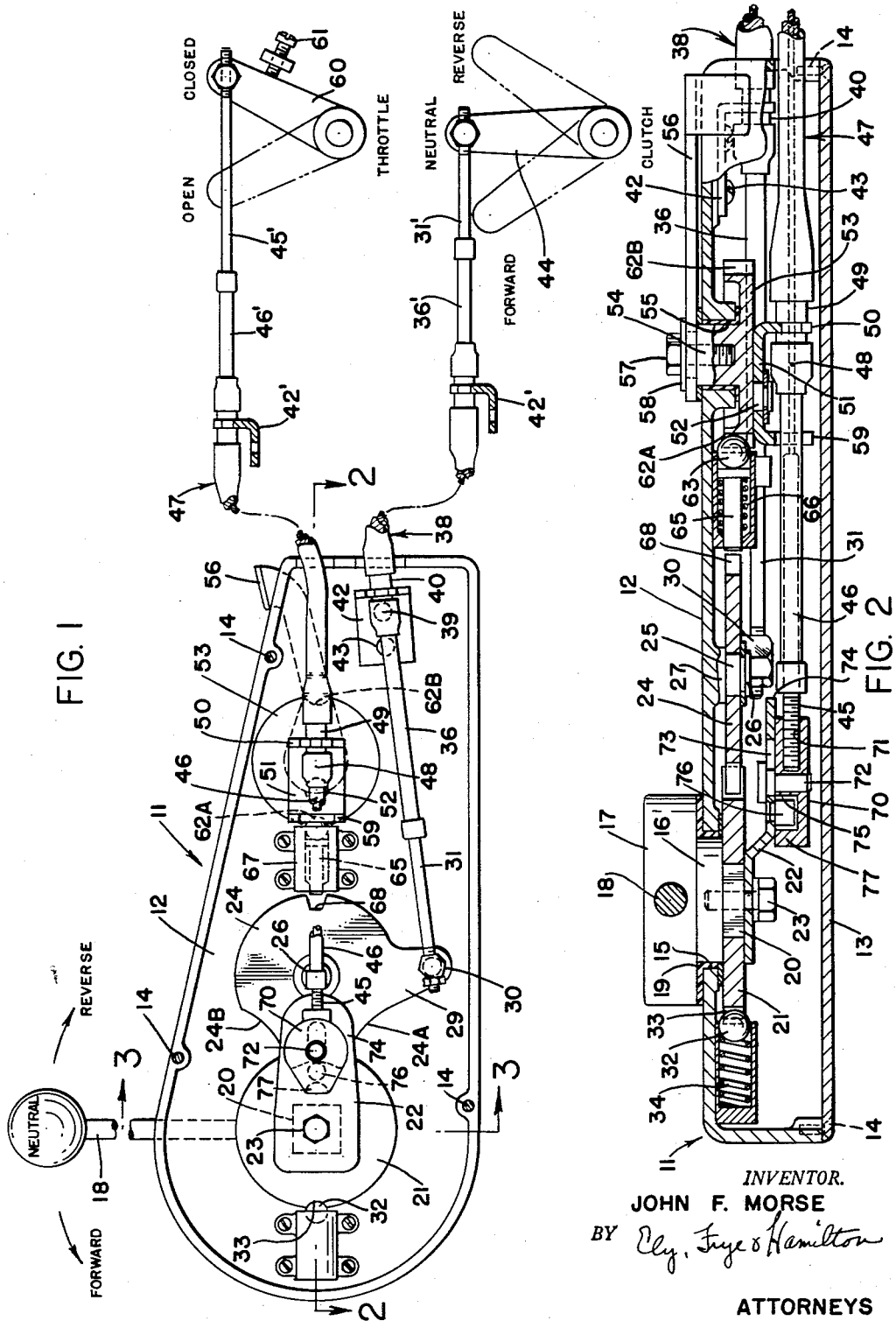

INVENTOR.
JOHN F. MORSE
BY
ATTORNEYS

United States Patent Office 2,971,618
Patented Feb. 14, 1961

2,971,618

THROTTLE CONTROL MECHANISM FOR SINGLE LEVER CONTROL

John F. Morse, 21 Clinton St., Hudson, Ohio

Filed Sept. 26, 1958, Ser. No. 763,621

6 Claims. (Cl. 192—.096)

The invention relates generally to a single lever control unit for operating the throttle and clutch of an engine such as an outboard marine engine. More particularly, the invention relates to a single lever control unit of the type shown in my copending application Serial No. 737,314, having a neutral auxiliary throttle mechanism for opening the engine throttle a limited amount in the neutral position of the control lever.

In my copending application Serial No. 762,848, filed concurrently herewith, I disclose a mechanism for eliminating advance of the engine throttle during movement of the clutch from neutral to forward or reverse position, in a single lever control unit which does not have an auxiliary neutral throttle mechanism.

The purpose of the present invention is to provide similar mechanism for eliminating advance of the engine throttle during the clutch shifting range in a control unit of the type shown in said application Serial No. 737,314, which has an auxiliary neutral throttle mechanism.

A specific object is to provide an improved single lever control having auxiliary throttle mechanism for starting and warming up the engine with the control lever in neutral position, and having improved mechanism for eliminating throttle advance as the control lever is moved through the forward or reverse shifting range.

These and other objects are accomplished by the improvements comprising the present invention, preferred embodiments of which are shown by way of example in the accompanying drawings, and described in detail herein. Various modifications and changes in details of construction are comprehended within the scope of the invention as set forth in the appended claims.

Referring to the drawings:

Fig. 1 is a rear side elevation of a single lever control unit embodying the invention, adapted for a pull-open throttle, with the control lever and auxiliary throttle lever in neutral position.

Fig. 2 is a plan sectional view on line 2—2 of Fig. 1.

Fig. 3 is a vertical sectional view on line 3—3 of Fig. 1.

Fig. 4 is an enlarged schematic view similar to Fig. 1, showing the control lever in neutral and the auxiliary throttle advanced.

Fig. 5 is a schematic view showing the control lever moved forwardly to the end of the forward shift range, and the auxiliary throttle in neutral position.

Figure 6:
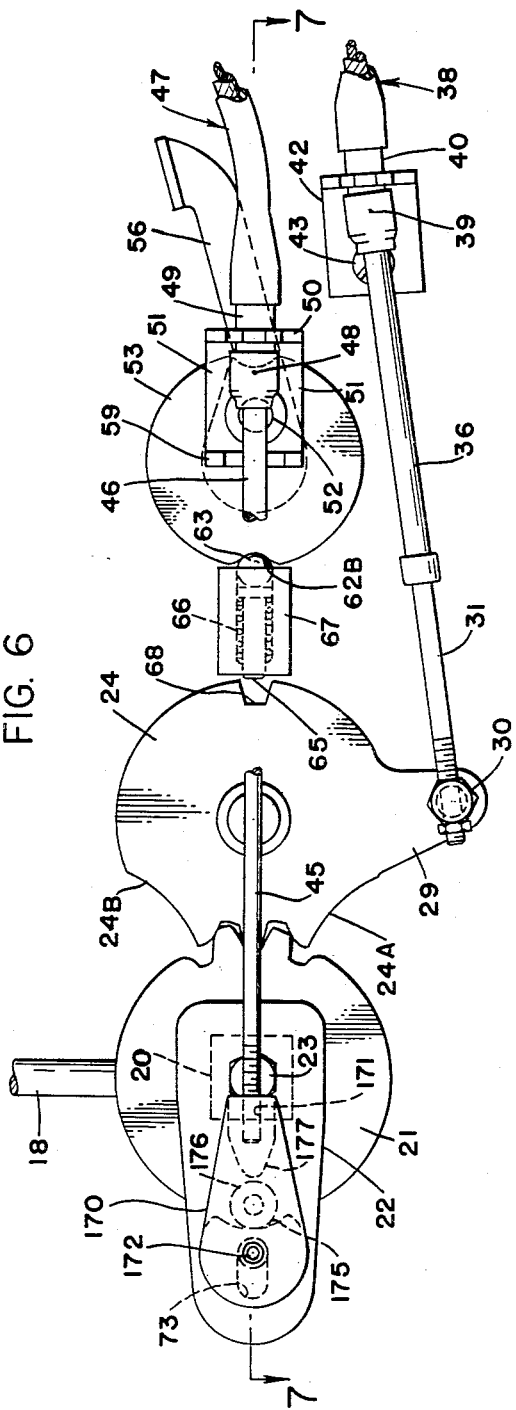
Fig. 6 is an enlarged schematic view similar to Fig. 1 of another embodiment adapted for a push-open throttle.

The control unit has a housing indicated generally at 11 comprising a front face plate 12 and a rear cover plate 13 secured to the periphery of plate 12 by screws 14. Suitable means (not shown) may be provided for attaching the housing to a mounting pad or the like on the side of the boat at the control station.

The face plate 12 has a bore 15 near its front end in which is journaled a reduced portion 16 of the hub shaft 17 in which the control lever 18 is mounted. Preferably, a bushing 19 journals the portion 16 in the bore. Inwardly of the portion 16 the shaft 17 has a squared portion 20 on which an interrupted or mutilated gear 21 is non-rotatively mounted. A throttle control lever arm 22 has its inner end overlying said squared portion and is secured thereto in abutment with gear 21 by a screw stud 23.

Figure 7:
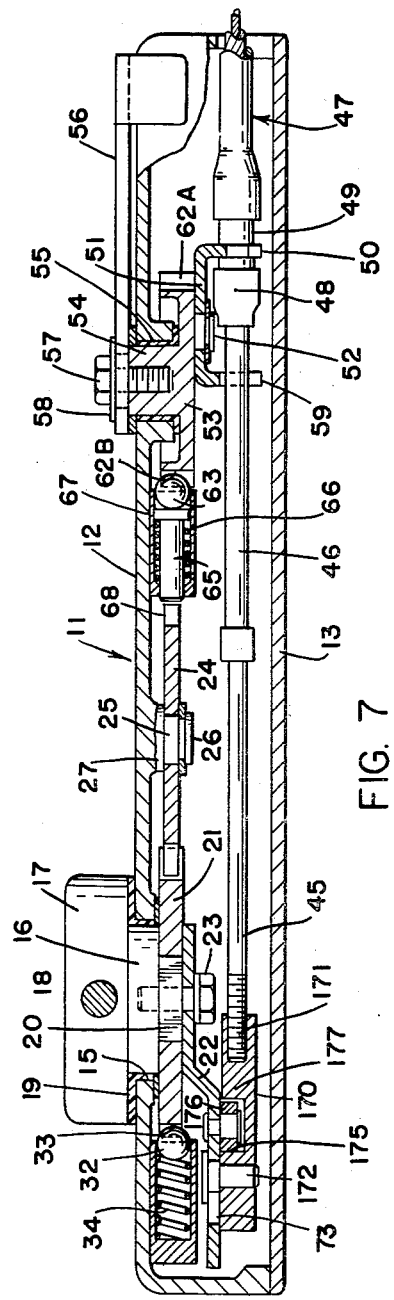
Fig. 7 is a plan sectional view thereof, as on line 7—7 of Fig. 6.

In the embodiment of Figs. 1–5 the arm 22 extends rearwardly from shaft 17 in the neutral position of control lever 18, and in the embodiment of Figs. 6 and 7 the arm 22 extends forwardly of the shaft in neutral position.

Referring to Figs. 1–5, the interrupted gear 21 meshes in neutral position with a second interrupted gear 24 rotatably mounted on the collar portion 25 of a stud 26 secured in the boss 27 on the interior of the face plate 12 and preferably horizontally aligned with the stud 23 extending axially of hub shaft 17. The gear 24 has a radial arm 29 which is preferably integral with the gear, and a swivel connector 30 is carried on the rear side of said arm for connection with a clutch control push rod 31. Preferably, a ball detent 32 is urged into a notch 33 in the gear 21 by a spring 34 to yieldingly hold the gears in the neutral position of Figs. 1 and 2.

The gears 21 and 24 may have the same pitch diameter and are meshed for about 40°–45° rotation in either direction from the neutral position of Fig. 1. Movement of the control lever 18 and gear 21 in either direction through about 40° rotates gear 24 in the opposite direction through a corresponding number of degrees to engage the clutch in forward or reverse. Beyond that angle, the gears become unmeshed and further rotation of the gear 21 advances the engine throttle while one of the arcuate faces 24A or 24B slidably engages the periphery of gear 21 (Fig. 5) to hold the clutch control gear 24 stationary with the clutch engaged.

Other well-known mechanisms, such as Geneva mechanisms, may be substituted for the gears 21 and 24 to obtain similar relative movement of the clutch and throttle controls, and the relative pitches of the gears may be varied, as desired.

The clutch control push rod 31 telescopes within one end of a sleeve 36 and is connected to the core of a push-pull cable indicated generally at 38. The opposite end of sleeve 36 has a pivot connection at 39 in one end of a bushing 40, the other end of which is secured to the end of the casing of cable 38. The bushing is mounted in an L-shaped bracket clip 42 secured to the face plate 12 of the housing by screws 43. As shown in Fig. 1, the cable 38 may be connected at its remote end to the clutch lever 44 of the engine by a similar push rod 31' telescoped in a sleeve 36' pivotally connected to a bracket clip 42' mounting the cable end.

The throttle control arm 22 is connected by mechanism to be described to a push rod 45 which telescopes within one end of a sleeve 46, and the push rod is connected to the core of a push-pull cable 47. The opposite end of sleeve 46 has a pivot connection at 48 in one end of a bushing 49, the other end of which is secured to the end of the cable casing. The bushing 49 is preferably mounted in the rear leg 50 of a U-shaped bracket 51 swiveled on a stud 52 which is eccentrically mounted in a plate 53, which plate has a concentric shaft extension 54 journaled in a bushing 55 and extending through housing front plate 12. The shaft 54 has a squared front end on which an auxiliary throttle lever 56 is keyed and held thereon by a screw 57 and washer 58.

The forward leg 59 of the bracket 51 is slotted and the rear end of sleeve 46 passes through said slot. When the sleeve 46 swings about pivot 48 due to rotation of the throttle control arm 22, it abuts one or the other end of the slot in leg 59 and swivels the bracket 51, so that further swinging of sleeve 46 permits maximum deflection of the cable without binding of the cable core in its casing. The construction and operation of this swivel bracket 51 is disclosed in detail and claimed in my copending application Serial No. 739,711, filed June 4, 1958, now Patent No. 2,935,891, dated May 10, 1960.

The cable 47 is connected at its remote end to the throttle lever 60 of the engine by a push rod 45' telescoped in a sleeve 46' pivotally connected to an L-shaped bracket clip 42' mounting the cable end. An adjustable idle limit stop 61 is preferably provided on the engine for abutting the lever 56 in its closed position.

Preferably, the plate 53 is substantially circular and has two diametrically opposite detent notches 62A and 62B. In the neutral position of the auxiliary throttle lever 56, as shown in Fig. 1, the notches 62A and 62B are horizontally aligned with eccentric stud 52 and in the plane of the push rod 45 connected to the throttle control arm 22. The detent notch 62A receives a spring-biased ball 63 in the neutral position of the auxiliary lever 56, and the notch 62B is provided to receive the ball in the embodiment of Figs. 6 and 7 where a push-open throttle is used.

The ball 63 is yieldingly pressed against the periphery of plate 53 by a plunger 65 urged by a spring 66 within casing 67 secured to front plate 12. The forward end of the plunger is aligned with a notch 68 in the gear 24 in the neutral position of the control lever. Accordingly, in the neutral position of the control lever 18, when the plate 53 is rotated by turning the auxiliary lever 56, the plunger 65 enters the notch 67 and locks the gear 24 in neutral position, as shown in Fig. 4. Conversely, if the control lever is first moved out of neutral position, the auxiliary lever 56 is locked in neutral or idle position as shown in Fig. 5, because the plunger cannot be extended to allow the ball 56 to ride out of the detent notch 62A.

If it is desired to advance the engine throttle for starting or warm up, without moving the control lever from its neutral position into the shifting range, the auxiliary lever 56 is moved forwardly toward the position of Fig. 4, thus rotating the eccentric pin 52 downwardly and rearwardly and carrying with it the bracket 51 and cable casing mounted therein. Since the cable core is held rigid by the push rod 45, this rearward push on the casing causes a differential forward movement or pull on the core and the throttle lever 60 to advance the throttle a limited amount for starting and warming up the engine.

As shown in Figs. 6 and 7, if a push-open throttle is used, the arm 22 and the plate 53 are mounted in diametrically opposite positions, and rotation of the plate 53 then moves the eccentric pin 52 upwardly and forwardly to pull the cable casing forwardly and exert a differential rearward movement on the cable core and throttle lever.

The construction and operation of the auxiliary throttle mechanism is described in detail and claimed in my copending application Serial No. 737,314, now Patent No. 2,884,109, dated April 28, 1959.

According to the present invention, the means connecting the throttle arm to the push rod 45 comprises a terminal link 70 having a threaded socket 71 into which the end of the push rod is screwed. The body of the link carries a central pin 72 and the periphery is convexly curved about the pin as a center. The pin 72 extends slidably through a radial slot 73 provided in the outwardly offset portion 74 of the throttle arm 22. The under side of the forward portion of link 70 has a forwardly facing concave cam surface 75 which in the neutral position of Fig. 1 is engaged by a pin or roller follower 76 mounted on the offset portion 74 adjacent the inner end of slot 73. The forward portion of link 70 also has a rounded stop 77 for engaging the forward side of follower 76 in neutral position, for a purpose to be described.

In operation, as the control lever 18 is rotated in either direction from neutral to rotate the arm 22 on the axis of shaft 17 and stud 23, the follower 76 rolls toward one end of concave surface 75 away from stop 77 and starts to push the pin 72 outwardly in slot 73.

When the control lever has been moved forwardly about 40° from neutral, for example, as shown in Fig. 5, the pin 72 reaches the outer end of slot 73 and the roller 76 passes completely out of the concave surface 75. Accordingly, during this 40° movement in either direction through the shift range, the pin 72 swings on an elongated radius about the pivot connection 48 as a center, so that instead of displacing the push rod 45 and advancing the throttle, there is no displacement of the push rod and no movement of the throttle lever 60.

Further rotation of control lever 18 in either direction causes the roller 76 to follow the convex arcuate periphery of link 70, and the roller continues to hold pin 72 at the outer end of slot 73, so that the pin swings on a shortened radius about the stud 23 as a center and displaces the push rod 45 to pull open the throttle lever 60. On closing the throttle, the reverse of these actions occurs, so that the throttle movement ceases when the pin reaches the clutch shifting range at about 40° from neutral position. Reference is made to my copending application Serial No. 762,848, filed concurrently herewith, for a more detailed description of the action of the pin and slot connection between the terminal link 70 and arm 22.

Now, when it is desired to operate the auxiliary lever 56 for starting or warm up of the engine, with the control lever 18 in neutral, as shown in Fig. 4, the forward movement of lever 56 rotates the eccentric pivot 52 rearwardly and pushes rearwardly on the casing of cable 47 as previously described. However, since the pin 72 in the link and the slot 73 in the throttle arm 22 are substantially aligned with the push rod 45 and sleeve 46, such rearward push would merely move the pin 72 radially outward in slot 73 so that the push rod assembly would move bodily with the cable casing and no differential forward pull would be exerted on the cable core to advance the engine throttle.

The purpose of the stop 77 is to prevent movement of the pin 72 in slot 73 in the neutral position of control lever 18, and insure that operation of the auxiliary lever 56 will cause a differential pull on the cable core to advance the engine throttle. Thus, the stop 77 is located opposite the pin 72 in alignment with push rod 45, so that in the neutral position of control lever 18 the stop abuts roller 76 and prevents movement of the link 70 by movement of the pin 72 in slot 73.

In the embodiment of Figs. 6 and 7, adapted for a push-open throttle, the arm 22 extends forwardly of the axis of shaft 17, and the terminal link 170 has a threaded socket portion 171 at its rear end for receiving the end of push rod 45. The forward end of link 171 carries a pin 172 and its periphery is convexly curved about the pin as a center. The pin 172 extends slidably through the radial slot 73 in the arm 22, and the under side of the forward end of link 170 has a concave rearwardly facing cam surface 175 which in the neutral position of control lever 18 is engaged by a follower 176 mounted on arm 22.

The socket portion 171 of the link is provided with a rounded projection 177 closely adjacent to the rearward side of follower 176 for engaging the follower in the neutral position of control lever 18 when the auxiliary lever 56 is operated, to prevent movement of pin 172 in slot 73 and corresponding bodily movement of the link 170, so as to insure that advancing the auxiliary throttle lever will cause a forward pull on the casing of the throttle control cable and a differential rearward push on the cable core to advance the engine throttle. When the control lever is rotated in either direction from neutral the follower 176 moves out from between the projection 177 and cam surface 175 to allow pin 172 to slide forwardly in slot 73.

In both embodiments of the invention the throttle control mechanism eliminates advance of the engine throttle in normal operation as the control lever is moved through the forward or reverse shifting range, enabling operating the engine at minimum forward and reverse speeds, and also enables operating the auxiliary throttle lever with the control in neutral, to advance the engine throttle a limited amount for starting or warming up the engine.

What is claimed is:

1. In a single lever engine control unit having a housing, a throttle control arm and a clutch control arm operatively connected thereto for rotation only during the first portion of rotation of the throttle control arm, said arms adapted for connection to the cores of push-pull cables for operating the throttle and clutch of said engine, the improvement comprising a terminal link connected to the throttle cable core and having a radially movable connection with said throttle control arm, a cam surface on said link, a follower on said throttle control arm engaging said cam surface to cause said link to swing on an elongated radius during the first portion of movement of the control lever in either direction from neutral, and a stop on said terminal link to prevent radial movement of said link when the control lever is in neutral.

2. In a single lever engine control unit having a housing, a throttle control arm and a clutch control arm operatively connected thereto for rotation only during the first portion of rotation of the throttle control arm, said arms adapted for connection to the cores of push-pull cables for operating the throttle and clutch of said engine, the improvement comprising a terminal link connected to the throttle cable core and having a pin and slot connection with said throttle arm to permit radial movement of the link, a concave cam surface on said link, a follower on said throttle control arm engaging said cam surface to cause said link to swing on an elongated radius during the first portion of movement of the control lever in either direction from neutral, and a stop on said terminal link to prevent radial movement of said link when the control lever is in neutral.

3. In a single lever engine control unit having a housing, a throttle control arm and a clutch control arm operatively connected thereto for rotation only during the first portion of rotation of the throttle control arm, said arms adapted for connection to the cores of push-pull cables for operating the throttle and clutch of said engine, the improvement comprising a terminal link connected to the throttle cable core and having a pin, said throttle control arm having a radial slot slidably receiving said pin, a cam surface on said link, a follower on said throttle control arm engaging said cam surface to cause said pin to swing on an elongated radius during the first portion of movement of the control lever in either direction from neutral, and a stop on said link to prevent radial movement thereof when the control lever is in neutral.

4. In a single lever engine control unit having a housing, a throttle control arm and a clutch control arm operatively connected thereto for rotation only during the first portion of rotation of the throttle control arm, said arms adapted for connection to the cores of push-pull cables for operating the throttle and clutch of said engine, the improvement comprising a terminal link connected to the throttle cable core and having a pin, said throttle control arm having a radial slot slidably receiving said pin, a concave cam surface on said link, a follower on said throttle control arm engaging said cam surface to cause said pin to swing on an elongated radius during the first portion of movement of the control lever in either direction from neutral, and a stop on said link for abutting said follower in the neutral position of the control lever to prevent radial movement of said link.

5. In a single lever engine control unit having a housing, a throttle control arm and a clutch control arm operatively connected thereto for rotation only during the first portion of rotation of said throttle control arm, said arms adapted for connection with push-pull cables for operating the throttle and clutch of said engine, and a push rod assembly having a pivotal connection at one end with said throttle operating cable, the improvement comprising a terminal link connected to the other end of said push rod assembly and having a radially movable connection with the throttle control arm, a cam surface on said link, a follower on said throttle control arm engaging said cam surface to cause said link to move radially outward and said push rod assembly to swing on an elongated radius about its pivotal connection with said throttle operating cable during the first portion of movement of said throttle control arm in either direction from neutral, and a stop on said link to prevent radial movement thereof when the throttle control arm is in neutral.

6. In a single lever engine control unit having a housing, a throttle control arm and a clutch control arm operatively connected thereto for rotation only during the first portion of rotation of said throttle control arm, said arms adapted for connection with push-pull cables for operating the throttle and clutch of said engine, and a push rod assembly having a pivotal connection at one end with said throttle operating cable, the improvement comprising a terminal link connected to the other end of said push rod assembly and having a pin, said throttle arm control having a radial slot slidably receiving said pin, a cam surface on said link, a follower on said throttle control arm engaging said cam surface to cause said pin to swing on an elongated radius about the pivotal connection of said push rod assembly with said throttle operating cable during the first portion of movement of said throttle control arm in either direction from neutral, and a stop on said link to prevent radial movement thereof when said throttle control arm is in neutral.

References Cited in the file of this patent

UNITED STATES PATENTS

| | | |
|---|---|---|
| 1,320,590 | Waters | Nov. 4, 1919 |
| 2,867,131 | Schroeder | Jan. 6, 1959 |